May 17, 1927.
W. M. TROUT
MOTOR VEHICLE
Filed Dec. 28, 1923
1,629,133
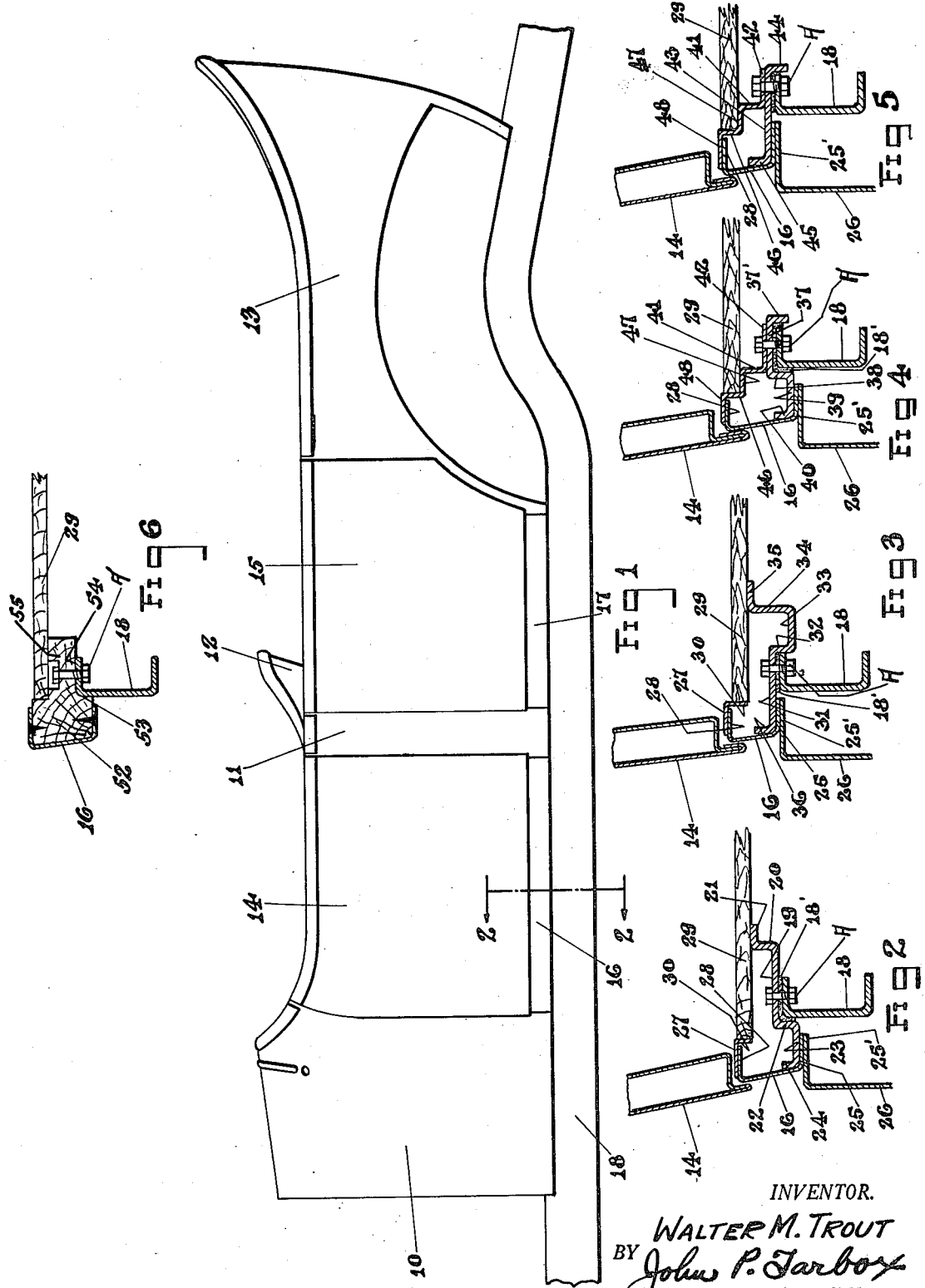
INVENTOR.
WALTER M. TROUT
BY John P. Tarbox
ATTORNEY Patented May 17, 1927.

1,629,133

UNITED STATES PATENT OFFICE.

WALTER M. TROUT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

MOTOR VEHICLE.

Application filed December 28, 1923. Serial No. 683,147.

My invention relates to improvements in motor vehicles and has to do, more particularly, with the construction of automobile bodies and the means for connecting such bodies to the chassis frame of a motor vehicle.

The main object of my invention is to provide interengaging means between the body sills and the chassis frame side members to prevent relative side or lateral movements of said sills and members, thereby relieving the bolts or other securing means employed to fasten the body sills and chassis frame side members together, as well as the body parts, of stresses and strains which otherwise would be imposed thereon.

Another object of my invention is to provide an automobile body construction which is particularly strong and durable, and which is, neverthless, light in weight and economical to manufacture.

A further object of my invention is to provide an automobile body having an improved sill construction which provides a more firm and rigid connection between the automobile body and the chassis frame of the motor vehicle on which it is mounted.

A further object of my invention is to provide an automobile body which is so constructed as to protect and seal the joints between the body sills and the side members of the chassis frame to prevent moisture from penetrating said joints as the result of rain or the application of water in washing the body.

Further objects, and objects relating to details and economies of operation and construction, will definitely appear from the detailed description to follow In one instance, I accomplish the objects of my invention by the devices and means set forth in the following specification. My invention is clearly defined and pointed out in the appended claims. A structure constituting a preferred embodiment of my invention is illustrated in the accompanying drawing forming a part of this specification, in which:

Fig. 1 is a view, in side elevation, of an automobile body constructed in accordance with my invention and mounted upon the chassis frame of a motor vehicle.

Fig. 2 is a sectional view through said body and frame, taken on the line 2—2 of Fig. 1, the side splasher being shown attached to the lower portion of the body.

Fig. 3 is a view similar to Fig. 2 but showing a modified form of my invention.

Fig. 4 is a sectional view similar to Fig. 2, but showing still another modification of my invention.

Fig. 5 is a sectional view similar to Fig. 2, but showing a third modification of my invention, and Fig. 6 is a view similar to Fig. 2, but showing a modification of my invention which is particularly adapted for a composite body.

In the drawing, the same reference numerals refer to the same parts throughout the several views.

Referring to the numbered parts of the accompanying drawing, in which I have illustrated an automobile body constructed in accordance with and constituting an embodiment of my invention, the body comprises the cowl panel, 10, side panels, 11, front seat panel, 12, tonneau panel, 13 and the side panels, 16 and 17, beneath the doors, 14 and 15. These panels are mounted, assembled and secured, in any desired way, to form, with the body sills, a complete unitary structure. The body is mounted on a chassis frame of any suitable type such as is commonly used in the construction of motor vehicles, said chassis frame including the side members, 18, extending longitudinally and connected by suitable cross-members. The body sills, one disposed at each side of the body, extend longitudinally thereof, and, preferably, are of pressed metal construction. In the form shown in Fig. 2, each comprises a horizontal portion, 19, having a vertical flange, 20, at the inner edge thereof, which is longitudinally straight from end to end. The flange, 20, may have a horizontally-extending flange, 21, at its upper edge, forming a support for the floor boards, 29, of the automobile body. At the outer edge of the horizontal body portion, 19, of the sill, there is a vertical, downwardly-turned portion forming a shoulder, 22, from the lower edge of which extends the horizontal portion, 23, of the sill. The vertical flange, 24, is provided at the outer edge of the horizontal portion, 23, and said flange, 24, may be curved longitudinally to conform to the curvature of the lower side portion of the automobile body. The panels forming the sides of the body are flanged underneath the portion, 23, of the sill, as shown at 25, and rigidly secured thereto by welding or otherwise. A side splasher, 26, has its upper edge flanged inwardly, at 25', and rigidly secured by welding or otherwise to the portion, 23, of the sill, or to the inturned body side panel flange, 25. The portions, 19, of the body sills, rest upon the upper flanges of the side members, 18, of the chassis frame. A layer of felt or "anti-squeak", 18', is interposed between the side member of the chassis frame and the body sill in order to make such joint less noisy. The vertical shoulders, 22, of the sill, at the opposite sides of the body, are so located that the outer edge portions of the chassis frame side members, 18, abut these shoulders so that the latter serve to prevent lateral shifting of the body with respect to the chassis frame. If desired, and as shown, the layer, 18', of felt or "anti-squeak" may be carried down between the shoulder, 22, and the upper portion of the side member, 18. At the door openings, the side panels, 16, are shown, in this instance, as flanged inwardly, at 28, and a threshold strip, 27, secured to said flange by welding or otherwise, said threshold strip being provided with a down-turned flange, 30, at its inner edge, which acts as a stop engaging the ends of the floor boards, 29, which are supported on the flanges, 21, of the body sills. The sills are rigidly secured to the side members, 18, of the chassis frame by means of the bolts, A, which extend through the portions, 19, of the sills, and through the top flanges of the side member, 18.

In Fig. 3, I have shown a modification of my invention which resembles the form shown in Fig. 2, in some particulars, but differs from it in that the shoulder, or downwardly-extending portion, of the sill is so formed that it engages the inner side of the chassis frame side member instead of the outer side, as in Fig. 2. In the construction shown in Fig. 3, the body is formed of panels as described with reference to Figs. 1 and 2. The body sills, which extend longitudinally of the body on opposite sides thereof, each have a horizontal body portion, 31, provided with a vertical flange, 36, at its outer edge, which may be longitudinally curved to conform to the curvature of the lower side portion of the body. The horizontal body portion, 31, of the sill, has a downwardly-extending portion, 32, at its inner edge, which is longitudinally straight from end to end, and which conforms to the corresponding side member of the chassis frame. From the lower edge of this portion, 32, there extends a horizontal portion, 33, having, at its inner edge, a vertical flange, 34, which is longitudinally straight from end to end and which extends upwardly above the plane of the horizontal portion, 31, of the body sill. A horizontal flange, 35, is provided at the upper edge of this vertical flange, 34, to constitute a support for the floor boards, 29. The ends of these floor boards may be engaged by the stop flange, 30, on the threshold strip, 27, as in the construction shown in Fig. 2. A side splasher, 26, may be secured rigidly, by welding or otherwise, to the portion, 31, of the body sill, or to the inturned flange, 25, of the body panel, as shown in Fig. 3. The horizontal portion, 31, of the body sill, rests upon the upper flange of the side member, 18, of the frame, a layer, 18', of felt or "anti-squeak", being interposed between the sill and the side member. It will be observed that the channel formed by the horizontal portion, 33, and the vertical flanges, 32 and 34, is longitudinally straight from end to end, constituting a longitudinally straight girder at the inner edge of the body sill. This channel portion extends downwardly below the level of the top flange of the side member, 18, and constitutes a shoulder or abutment engaging the inner edge of the side member, 18, and co-operating with the corresponding structure at the opposite side of the body, preventing the body from shifting laterally with respect to the chassis frame upon which it is mounted.

In Fig. 4, I have shown another modification of my invention in which the metal body sill is provided with a horizontal portion, 37, having a downwardly-extending vertical flange, 37', at its inner edge, which is substantially straight from end to end. The sill also has a downwardly-extending vertical portion, 38, at the outer edge of the horizontal portion, 37, which is also longitudinally straight from end to end. The horizontal portion, 39, of the body sill extends outwardly from the lower edge of the portion, 38, and has, at its upper edge, a vertical flange, 40, which may be longitudinally curved to conform to the lower side portion of the body. A Z-shaped member, 41, has a flange, 42, which rests upon the horizontal portion, 37, of the sill, and is secured thereto by the bolts, A, which connect the sill to the side member, 18, of the chassis frame. This Z-shaped member, 41, has a horizontal flange, 47, which supports the ends of the floor boards, 29. This flange, 47, may be provided with an upwardly-extending vertical flange, 46, which engages the ends of the floor boards, 29, and serves as a stop to prevent them from shifting in an endwise direction. The upper edge of this flange, 46, may be bent laterally, at 48, and rigidly secured to the inturned flange, 28, of the side panel, 16, the lower edge of which is inturned and secured to the walls as in the forms previously described. It will be observed that the horizontal portion, 37, of the sill, together with the flanges, 37' and 38, form a longitudinally-extending inverted channel, which is substantially straight from end to end, forming a straight girder portion at the inner edge of the body sill. The body is secured to the chassis by the bolts, A, passing through the upper flange of the side member, 18, through the portion, 37, of the sill, and through the lower flange of the Z-shaped member, 41.

In Fig. 5, I have shown another modification of my invention in which the sill has a horizontal portion, 43, which is provided with a down-turned, vertical flange, 44, at its inner edge, said flange being longitudinally straight from end to end. At the outer edge of the sill, there is provided an upwardly-extending, vertical flange, 45, which may be longitudinally curved to conform to the curvature of the lower portion of the automobile body. A Z-shaped member 41, similar to that described in connection with the modification shown in Figure 4, rests upon the sill and is stepped to support the floor boards. As in the former case it is secured to the side panel 16. The portion, 43, of the sill, rests upon the upper flange of the side member, 18, of the frame and is secured thereto by the bolts, A, passing through said upper flange, the horizontal portion, 43, of the sill and the lower flange, 42, of the Z-shaped member, 41. The downwardly-extending flange, 44, of the sill, extends along the inner edge of the side member, 18, of the frame, and constitutes a shoulder engaging said side member, which cooperates with a similar structure at the opposite side of the body to prevent the body from shifting laterally with respect to the chassis frame. The lower portion of the panel 16, the side splasher 26 and the anti-squeak material 18' are arranged in a manner similar to that described in the modification shown in Figures 2 to 4.

In Fig. 6, I have shown a modification of my invention as applied to a body of the "composite" type, having wooden sills. The sill member, 52, has an inwardly-extending portion, 55, which is of less thickness than the outer portion of the sill, thus forming a vertical shoulder, 53, and a horizontal surface, 54, at the inner edge of said sill member. The upper flange of the side member, 18, of the chassis frame, engages the horizontal surface, 54, of the sill, and the vertical shoulder, 53, of the sill engages the outer side of said side member. The floor boards, 29, rest upon the upper surface of the portion, 55, of the sill, and the body is secured to the chassis frame by the bolts, A, passing through the portion, 55, of the sill and through the top flange of the side member, 18. The panels forming the sides of the body are shown in this instance as flanged under and secured to the portion, 53, of the sill, by screws, nails or any other suitable means. It will be observed that this construction provides a "composite" body having interengaging means between the body sills and the side members of the chassis frame to prevent the body from shifting laterally with respect thereto.

It will be observed that the body constructions shown in Figs. 2, 3, 4, and 5 all utilize a metal sill of the "straight sill" type, having a longitudinally straight girder portion at the inner edge of the sill. In this respect, the present invention is an improvement upon the construction described and claimed in the patent of Joseph Ledwinka for motor vehicles, No. 1,431,314, October 10, 1922. This present invention is also an improvement upon the inventions described and claimed in the pending applications of Joseph Ledwinka, Serial Number 290,787, filed April 17, 1919, for sheet metal body structures for automobiles, and Serial No. 431,732, filed December 18, 1920, for motor vehicles.

The body construction disclosed in the present application is a decided improvement upon prior constructions, in which the body was simply secured to the chassis frame by bolts passing through the sills and through the side members of the chassis frame. The only thing, in such prior constructions, which prevented lateral shifting of the body with respect to the frame upon which it was mounted, was the engagement of the bolts with the edges of the bolt holes through which they pass. The constant use of such a body resulted in a wearing and enlargement of such bolt holes, and allowed a consequent shifting of the body on the frame with a distortion of the parts of the body resulting in loosening such parts, and producing rattles and other disagreeable noises. By means of my invention, the strain of preventing lateral shifting of the body on the chassis frame has been removed from these bolts, and the metal surrounding the bolt holes through which the bolts pass, and the sill of the body has been so formed as to prevent such lateral shifting. This is an improvement which results in a much quieter and stronger body and one which proves more durable in use.

I am aware that the body construction disclosed in the present application may be varied considerably without departing from the spirit of my invention, and, therefore, I claim my invention, broadly, as indicated by the appended claims.

Having thus described my invention, what I claim as new and useful and desire to secure by Letters Patent is:

1. In an automobile body, the combination of a pressed metal body sill having a horizontal body portion, adapted to rest on the upper surface of a chassis frame side member, a vertical shoulder extending downwardly from the outer edge of said horizontal body portion, and adapted to engage the outer side of said frame side member, and a portion extending horizontally from the lower edge of said vertical shoulder, and a plurality of sheet metal body panels having their lower edges rigidly secured to said last-mentioned horizontal portion of the sill.

2. A pressed metal sill for an automobile body comprising a horizontal portion having a vertical flange extending upwardly at the inner edge thereof, a vertical portion extending downwardly at the outer edge of said horizontal portion, a second horizontal portion extending outwardly from the lower edge of said vertical portion, and a vertical flange extending upwardly at the outer edge of said last-mentioned horizontal portion.

3. In a motor vehicle, the combination of a chassis frame, having a pair of side members, and a body mounted on said frame and having a pair of pressed metal sills disposed at opposite sides of the body, each of said sills having a horizontal portion resting on the upper surface of the corresponding side member of the frame, a vertical portion at the outer edge of said horizontal portion and adapted to engage the outer side of the said frame side member, and a horizontal portion extending outwardly from the lower edge of said vertical portion and to which the body panels are secured.

4. In a motor vehicle, the combination of a chassis frame, having a pair of side members, and a body mounted on said frame and comprising a plurality of sheet metal panels and a pair of pressed metal sills disposed at opposite sides of the body, each of said sills having a horizontal body portion offset to provide a vertical shoulder, adapted to engage the corresponding side member of the chassis frame to prevent lateral shifting of the body, and having a longitudinally straight girder portion, at its inner edge, and a flange, at its outer edge, curved to conform to the curvature of the lower side portion of the body.

5. In an automobile body, the combination of a plurality of sheet metal body panels, and a pair of pressed metal sills disposed at opposite sides of the body, each of said sills comprising an upper horizontal portion provided with vertical portions at the inner and outer edges thereof, and a lower horizontal portion extending from the lower edge of the outer of said vertical portions.

6. In a motor vehicle, the combination of a chassis frame, having a pair of side members, a body mounted on said frame and including a pair of sills disposed at opposite sides of the body, and a plurality of sheet metal panels rigidly secured to said sills, each sill including a pair of horizontal portions disposed in different planes and connected by an intermediate vertical portion which engages the corresponding side member of the chassis frame to prevent lateral shifting, and vertical flanges extending upwardly from the free edges of said horizontal portions.

7. In an automobile body, the combination of a pressed metal body sill of Z cross section having one branch adapted to rest on the upper surface of a chassis frame side member, another branch substantially vertically extending and adapted to rest against the side edge of the same chassis frame member, and sheet metal body panels connected to the third branch thereof.

8. In an automobile body, the combination of a pressed metal body sill having a horizontally extending body portion adapted to rest on the upper surface of a chassis frame side member, sheet metal body panels having their lower edges rigidly secured to said body sill on its margin removed from the margin resting on the chassis frame side member and substantially vertically extending offsets from the body of said sill adapted to engage a side edge of the chassis frame side member and lying in a region removed from the sheet metal body panel.

9. In an automobile body, the combination of a pressed metal body sill of angle cross section having a horizontally extending branch adapted to rest on the upper surface of a chassis frame side member and a vertically extending branch, a plurality of sheet metal body panels having their lower edges flanking the vertically extending branch and connected to the metal body sill, and vertically extending offsets in the horizontally extending branch of said sill adapted to engage the side edge of said sill to prevent lateral movement of the body sill with respect thereto.

In testimony whereof, I affix my signature.

WALTER M. TROUT.